Feb. 28, 1950          A. CHRISTENSEN          2,499,298
WINDSHIELD WIPER
Filed March 27, 1944                            3 Sheets-Sheet 1
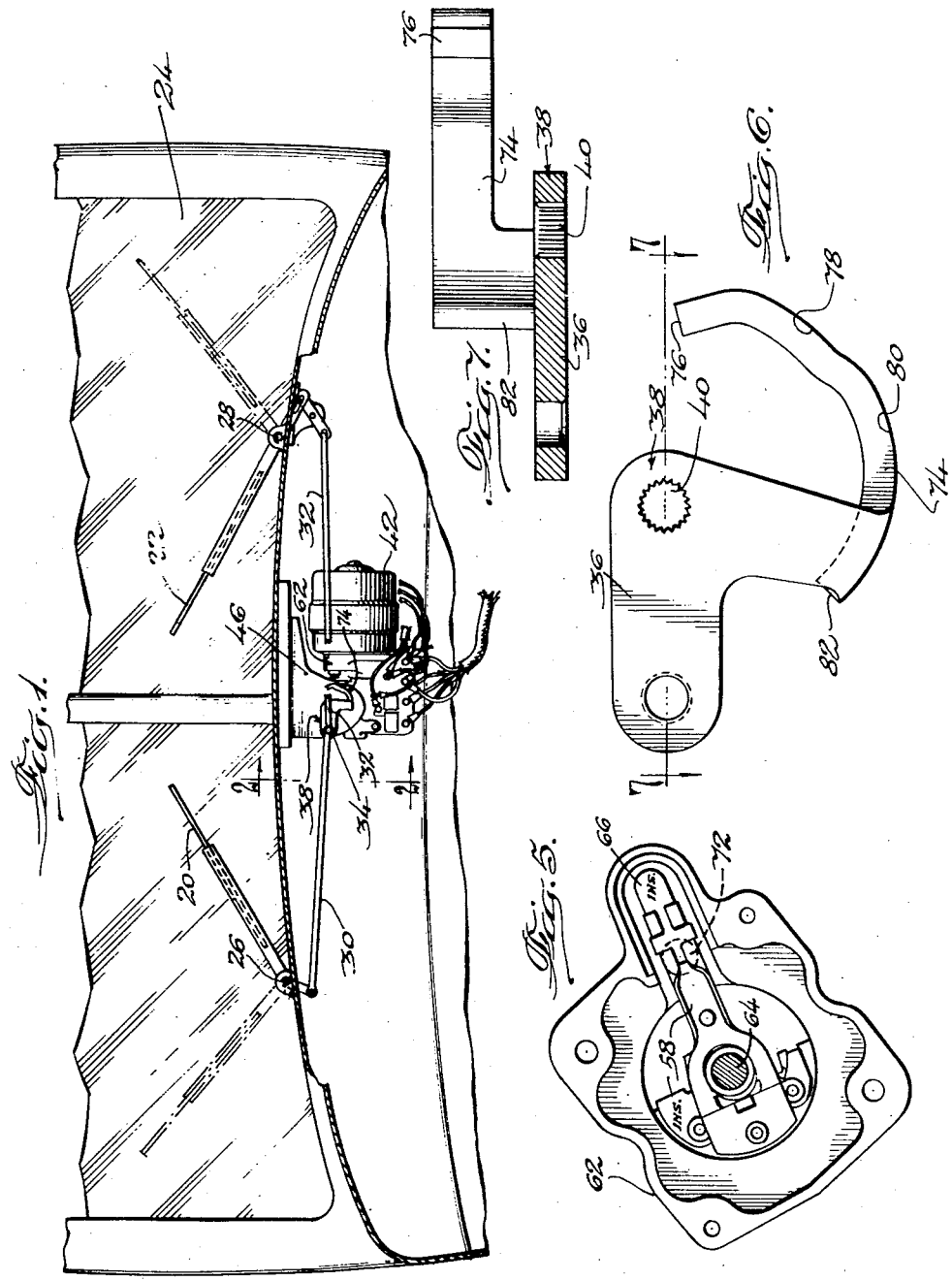
Inventor:
Alfred Christensen
By Williams, Bradbury & Hinkle
Attorneys

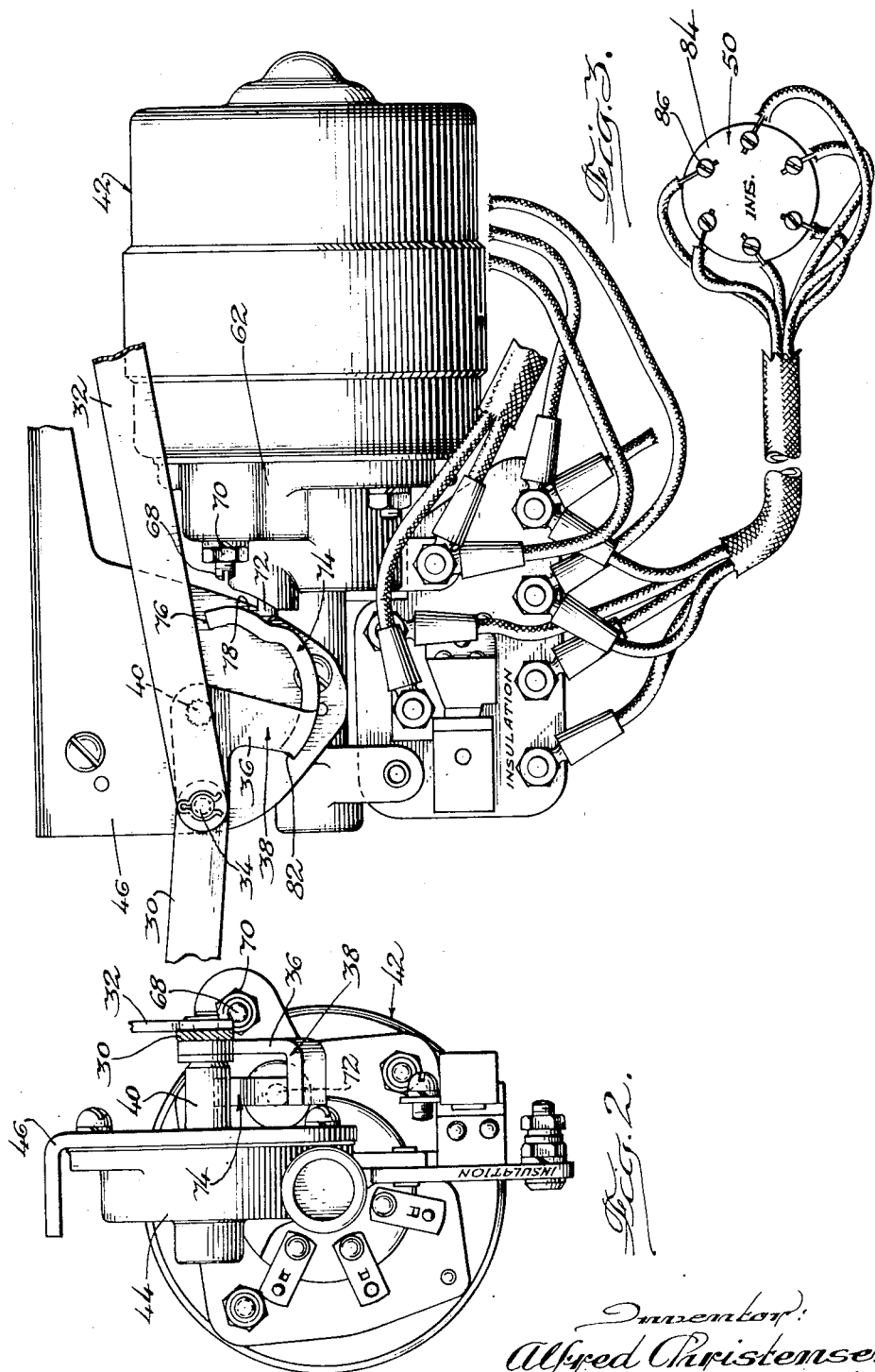

Feb. 28, 1950  A. CHRISTENSEN  2,499,298
WINDSHIELD WIPER
Filed March 27, 1944  3 Sheets-Sheet 3

HIGH  LOW  STOP
THREE POSITIONS OF SWITCH

Inventor:
Alfred Christensen
By Williams, Bradbury & Hinkle
Attorneys.

Patented Feb. 28, 1950

2,499,298

UNITED STATES PATENT OFFICE 2,499,298

WINDSHIELD WIPER

Alfred Christensen, Chicago, Ill., assignor to Stewart-Warner Corporation, Chicago, Ill., a corporation of Virginia Application March 27, 1944, Serial No. 528,266

6 Claims. (Cl. 15—253)

My invention relates to windshield wipers and more particularly to multi-speed electrically driven windshield wipers for automobiles and similar purposes.

An object of my invention is to provide a new and improved electric windshield wiper of the multi-speed type, which is of simple and reliable construction and which may be inexpensively manufactured and installed.

Another object of my invention is to provide a new and improved electric windshield wiper having simple and reliable means for insuring parking of the wiper blades in proper position when the wiper is stopped.

Another object of my invention is to provide an electrically driven windshield wiper having a new and improved circuit arrangement.

Another object of my invention is to provide a windshield wiper having new and improved control means.

Another object of my invention is to provide a windshield wiper having a new and improved cam control for insuring proper sequence of operations.

Other objects and advantages will become apparent as the description proceeds.

In the drawings,

Fig. 1 is a front view, partly in section, of an automobile showing a preferred embodiment of my invention installed thereon;

Fig. 2 is a vertical sectional view taken on the line 2—2 of Fig. 1 and showing the driving mechanism on an enlarged scale;

Fig. 3 is an enlarged view of the driving mechanism shown in Fig. 1;

Fig. 5 is a transverse sectional view of the switch mechanism and is taken on the line 5—5 of Fig. 4;

Fig. 6 is an enlarged view of the unitary crank arm and switch control cam;

Fig. 7 is a sectional view of the crank arm and switch control cam and is taken on the line 7—7 of Fig. 6;

Figures 9, 10, 11:
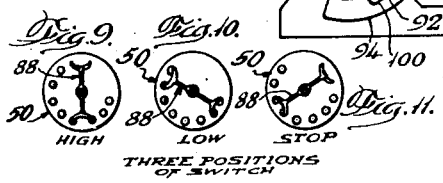

Figs. 9, 10, and 11 are diagrammatic views showing the manual switch in different positions.

Referring particularly to Fig. 1, it will be seen that I have illustrated a preferred embodiment of my invention as comprising a pair of wiper blades 20 and 22 mounted on the individual sections of the divided windshield 24 of a conventional automobile. The wiper blades are pivoted to the automobile body as indicated at 26 and 28, respectively, and are connected by links 30 and 32 to a crank pin 34. The crank pin 34 is mounted in the crank arm 36 of a driving crank 38 affixed to a crank shaft 40. The crank shaft 40 is driven by an electric motor 42 through a worm and worm wheel located in a housing 44, which also provides bearings for the crank shaft 40. The motor 42, housing 44 and associated mechanism are mounted on a bracket 46 attached in any suitable manner to the body of the automobile.

Figure 8:
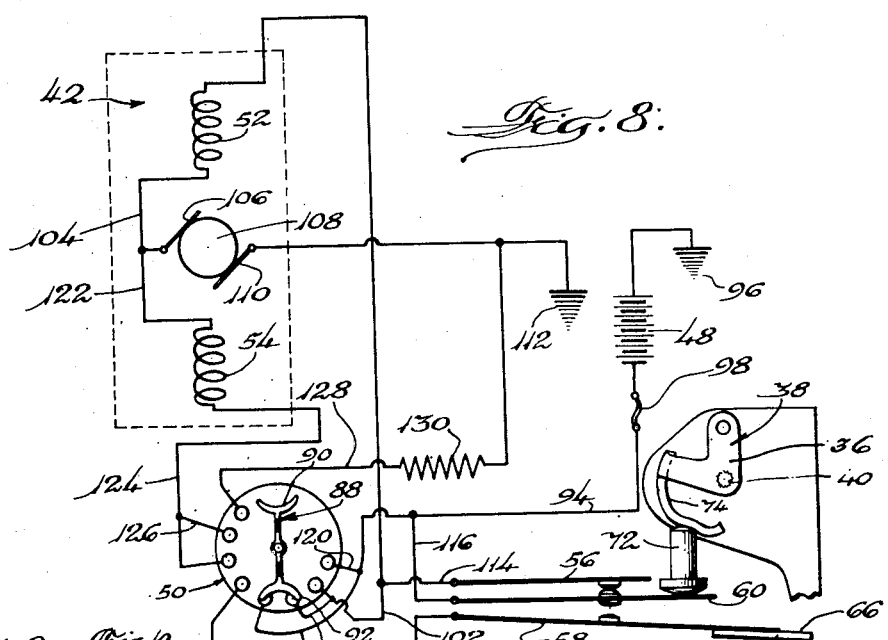
Fig. 8 is a wiring diagram.

The motor 44 is connected by suitable wiring to the automobile battery, indicated by the reference character 48 in Fig. 8, and this connection may be established through the automobile ignition switch in the usual manner. The operation of the windshield wiper is manually controlled by a manual switch 50 which will ordinarily be located on the instrument panel of the vehicle, or in any other suitable and convenient location. My new and improved windshield wiper is designed to operate at either of two speeds as the operator may desire, and the starting and stopping of the wiper and the selection of the desired speed of operation are controlled by the automobile driver through the manual switch 50.

It is desirable, however, in windshield wipers of this general type to have the wiper blades stop at one extreme of their movement when the operation of the windshield wiper is no longer desired. It is unsatisfactory to rely upon the usual manual starting and stopping switch to insure stopping the wiper blades at one extreme of their range of motion, since there is a certain amount of momentum in the moving parts, and the blades continue to move after the ordinary control switch is shifted to the "off" position. While it is possible for the driver to guess to some extent the amount of overrun of the wiper blades, this overrun will vary with different conditions of the surface of the windshield, and furthermore, would require the operator to pay close attention to the position of the wiper blade at the time he turned the manual switch to "off" position.

In order to insure proper positioning of the wiper blades when the windshield wiper is not in use, I have, therefore, found it desirable to provide automatic switch control means and novel circuit arrangements which I shall now describe. Referring particularly to Fig. 8, it will be seen that the motor 42 is of the split field type having one field coil indicated by reference character 52, and the other field coil indicated by reference character 54. The automatic switch mechanism comprises fixed switch members 56 and 58 and a movable resilient switch member 60 whose natural resiliency urges it into engagement with the fixed switch member 56.

Figure 4:
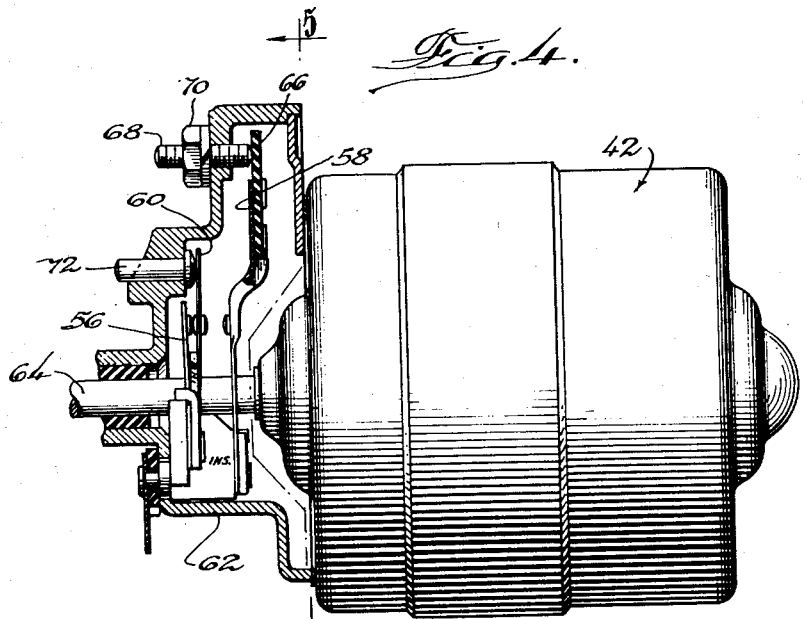
Fig. 4 is a view, partly in longitudinal section, showing the switch mechanism for controlling the several electrical circuits.

Referring to Fig. 4, it will be seen that the several switch members are located in a switch housing 62 attached to one end of the motor casing and surrounding the motor shaft 64. The switch member 58 has an extension 66 of insulating material, which is engaged by an adjusting screw 68 secured in adjusted position by a lock nut 70. The adjustment of the switch member 58 permits the switch mechanism to be accurately timed so that the wiper blades are automatically stopped in the desired position.

The movable switch member 60 is shifted through its range of operation by a switch pin or cam follower 72 slidably mounted in the housing 62 and urged into cam engaging position by the resilience of the switch member 60. The switch pin 72 is positioned for engagement by a cam 74 formed integrally with the drive crank 38 and shown most clearly in Figs. 6 and 7. This drive crank is stamped out of a single piece of metal and the opening for the crank shaft 40 is fluted as clearly shown in these figures, so that the drive crank can be pressed on to the correspondingly fluted end of the crank shaft. The cam 74 has an inclined end 76 of minimum diameter which first engages the pin 72 to move switch member 60 out of engagement with switch member 56. The end 76 of the cam 74 is followed by a dwell portion 78 of intermediate diameter, which holds the switch member 60 in intermediate position out of engagement with the other switch members. This portion 78 of the cam is followed by a maximum diameter portion 80, which holds the switch member 60 in engagement with the switch member 58. The rear end portion 82 of the cam is of successively decreasing diameter to permit return of the switch member 60 to normal position.

The manual switch 50, which is mounted on the instrument panel of the automobile, comprises a disc 84 of insulating material in which are mounted a plurality of fixed metal contacts 86. These contacts are connected by wires, as clearly shown in Fig. 3, to the other elements of the electrical circuits, as hereinafter explained more fully in the description of the wiring diagram of Fig. 8. The switch 50 is also provided with a bridge member 88 of insulating material and having metal contact engaging strips 90 and 92 at opposite ends thereof. The bridge member 88 is adapted to be manually shifted to bring the metal strips 90 and 92 into engagement with various groups of fixed contacts to control the operation of the windshield wiper.

In Fig. 8 the bridge member 88 is in the high speed position. In this position of the bridge member the left-hand end of the lower metal strip 92 engages a contact which is connected by wire 94 to one terminal of battery 48, the other terminal of which is grounded, as indicated at 96. A circuit breaker 98 of conventional design is illustrated as being interposed between the battery 48 and wire 94, although it will be understood by those skilled in the art that this circuit breaker can be made a part of the motor in accordance with conventional practice. The right-hand end of metal strip 92 engages a second fixed contact connected by wires 100 and 102 to field coil 52. This field coil is connected by wire 104 to one brush 106 of the motor armature 108. The other brush 110 is grounded, as indicated at 112.

In this position of the manual switch, current flows from the battery 48 through wire 94, metal strip 92, wires 100 and 102, field coil 52, wire 104, brush 106, armature 108 and brush 110 to ground 112 and the motor operates at maximum speed. In the position of the automatic switch shown in Fig. 8, the connection between wires 94 and 102 through the manual switch is in parallel with a similar connection through switch members 56 and 60, since switch member 56 is connected to wire 102 by conductor 114, and switch member 60 is connected to wire 94 by a conductor 116.

Each rotation of the crank shaft will cause the cam 74 to move switch member 60 out of engagement with switch member 56 and thereby break this parallel circuit, but as long as the manual switch remains in the high speed position, breaking of the contact between switch members 56 and 60 will have no effect on the operation of the wiper. Switch member 58 is connected by a conductor 118 to a fixed contact which is isolated from all other contacts of the manual switch so that no new circuit is established when switch member 60 is moved into engagement with switch member 58.

Fig. 10 illustrates the position of the bridge member 88 when the manual switch is shifted to the low speed position. In this position of the manual switch the battery 48 is connected through wires 94, 120, metal strip 92 and wire 102 to the field coil 52. When the automatic switch is in the position shown in Fig. 8, a parallel connection between wires 94 and 102 is also established through switch members 56 and 60 in the same manner in which this circuit is established when the manual switch is in the high speed position. Likewise operation of the automatic switch has no more effect on the operation of the wiper when the manual switch is in the low speed position than when the manual switch is in the high speed position.

When the manual switch is in the high speed position, however, all of the current flowing through the field coil 52 passes through the armature 108, but where the manual switch is in the low speed position, only part of this current passes through the armature. The remainder passes through a parallel circuit comprising wire 122, field coil 54, wires 124, 126, metal strip 90, wire 128 and resistance 130 to ground. The field coils 52 and 54 are in opposition to each other, but since only a portion of the current flowing through the coil 52 passes through the opposing coil 54, the motor is not stopped but operates at a reduced speed.

The position of the bridge member 88 when the manual switch is turned to "off" position is shown in Fig. 11. In this position of the manual switch, current flows from the battery through switch members 60 and 56, field coil 52 and armature 108 to ground. As soon as cam 74 breaks the contact between switch member 60 and switch member 56, the flow of current to the motor is cut off. When the cam 74 moves switch member 60 into contact with switch member 58, full current flows from battery 48 through wires 94 and 116, switch members 60 and 58, wire 118, strip 92, wire 124, field coil 54 and armature 108 to ground. This flow of current tends to reverse the direction of rotation of the motor and quickly overcomes the momentum of the moving parts. This reverse current is maintained for only a brief interval of time and thereafter switch member 60 returns to mid position, whereupon the reverse current is cut off and no current is supplied to the motor. As the motor and wiper blades have no momentum, the parts come to rest in this position.

It should be noted that the wiper blades are stopped at one extreme of their range of movement, and that when the wiper blades are at the extremes of their range of movement, the windshield wiper mechanism has a minimum of inertia available to continue its operation. A minimum amount of current is, therefore, sufficient to check the slight inertia of the moving parts when the wiper blades are in this position. The duration of the reverse current can be readily controlled by adjusting the screw 68, which determines the normal position of the switch member 58. While this switch member has been referred to as a fixed member, it yields slightly when engaged by switch member 60 and is maintained against adjusting pin 68 by virtue of its inherent resiliency.

While I have illustrated and described only a single embodiment of my invention, it is to be understood that my invention may assume numerous forms and is not limited to the particular details shown and described, but includes all modifications, variations and equivalents coming within the appended claims.

I claim:

1. In a windshield wiper of the class described, which includes a wiper blade and linkage for driving said blade, an electric motor for operating said linkage, a first circuit for driving said motor at high speed, a pair of circuits for driving said motor at a lower speed, one of said last named circuits being a driving circuit and the other of said last named circuits being a bucking circuit, and a two-speed switch controlling said circuits.

2. A windshield wiper of the class described which includes a wiper blade and linkage for driving said blade, an electric motor for operating said linkage, said motor having a driving circuit, and a reversing circuit, said reversing circuit providing less torque than said driving circuit, manually actuated switch means for establishing said driving circuit alone to drive said linkage at high speed when said switch is in one position, said switch when in another position establishing circuits through both said driving circuits and said reversing circuit so that said motor drives said linkage at reduced speed through forward operation of said motor, automatic switch means operated in timed sequence with said linkage, said manual switch having a third position in which control of said circuits is transferred to said automatic switch means, said automatic switch means when said manual switch means is in the third position operating to establish the driving circuit for said motor until the wiper blade reaches a predetermined position at which point both the driving circuit and reversing circuit are disestablished, and said automatic switch means establishing the reversing circuit alone if said wiper blade moves beyond said predetermined position.

3. A windshield wiper of the class described which includes a wiper blade and linkage for driving said blade, an electric motor for operating said linkage, said motor having a driving circuit and a bucking circuit, manually operable switch means for establishing said driving circuit or said driving and said bucking circuits together, and automatic switch means operated in timed sequence to said linkage for establishing the driving circuit, the bucking circuit alone, or for disestablishing both of said circuits.

4. A windshield wiper of the class described which includes a wiper blade and linkage for driving said blade, an electric motor for operating said linkage, said motor having circuits for high speed operation, for low speed operation and for reverse operation, manually operable switch means for optionally establishing the high speed circuit or low speed circuit, and automatic switch means operated in timed sequence to said linkage for establishing the high speed circuit, the reverse circuit or for disestablishing both of said circuits depending upon the position of said linkage.

5. A windshield wiper of the class described which includes a wiper blade and linkage for driving said blade, an electric motor for operating said linkage, said motor having circuits for high speed operation, for low speed operation and for reverse operation, manually operable switch means for establishing the high speed circuit or low speed circuit, and automatic parking means for stopping said linkage in a predetermined position, said automatic parking means accommodating for overshooting of the linkage beyond said predetermined position by momentarily establishing the reversing circuit if overshooting takes place.

6. A windshield wiper of the class described which includes a wiper blade and linkage for driving said blade, an electric motor for operating said linkage, said motor having circuits for forward operation and reverse operation, manually operable switch means for establishing the circuit for forward operation, and automatic parking means for stopping said linkage in a predetermined position, said automatic parking means accommodating for overshooting of the linkage beyond said predetermined position by momentarily establishing the reversing circuit if overshooting takes place.

ALFRED CHRISTENSEN.

REFERENCES CITED

The following references are of record in the file of this patent:

UNITED STATES PATENTS

| Number | Name | Date |
|---|---|---|
| 1,644,545 | Robertson | Oct. 4, 1927 |
| 1,996,476 | Krause | Apr. 2, 1935 |
| 2,226,700 | Appleman | Dec. 31, 1940 |
| 2,264,013 | Webb | Nov. 25, 1941 |
| 2,359,553 | Fuller | Oct. 3, 1944 |
| 2,370,101 | Whitted | Feb. 20, 1945 |

FOREIGN PATENTS

| Number | Country | Date |
|---|---|---|
| 348,542 | Great Britain | May 12, 1931 |